United States Patent [19]

Hinde

[11] Patent Number: 5,005,901
[45] Date of Patent: Apr. 9, 1991

[54] REMOVABLE SEAT COVER
[75] Inventor: Brian Hinde, Honolulu, Hi.
[73] Assignee: Seatector Hawaii, Inc., Honolulu, Hi.
[21] Appl. No.: 438,295
[22] Filed: Nov. 16, 1989
[51] Int. Cl.⁵ .............................................. A47C 31/11
[52] U.S. Cl. .................................... 297/229; 297/220
[58] Field of Search ............... 297/219, 229, 220, 224, 297/225

[56] References Cited
U.S. PATENT DOCUMENTS 4,273,380 6/1981 Silvestri .......................... 297/229 X
4,302,046 11/1981 Lazazzero ....................... 297/229 X
4,725,094 2/1988 Greer .................................. 297/229
4,877,288 10/1989 Lee ...................................... 297/229

Primary Examiner—Peter R. Brown
Attorney, Agent, or Firm—Jordan and Hamburg

[57] ABSTRACT

A removable cover for a seat, particularly an automobile or other vehicle seat, the seat having a seat portion and a back portion, is made of a pliable material and has a back covering portion, a seat covering portion and, formed on an exterior surface of the cover, a pocket. The back covering portion, seat covering portion and pocket are integral, and the back covering portion and the seat covering portion are receivable in the pocket when the cover is not in use.

1 Claim, 2 Drawing Sheets

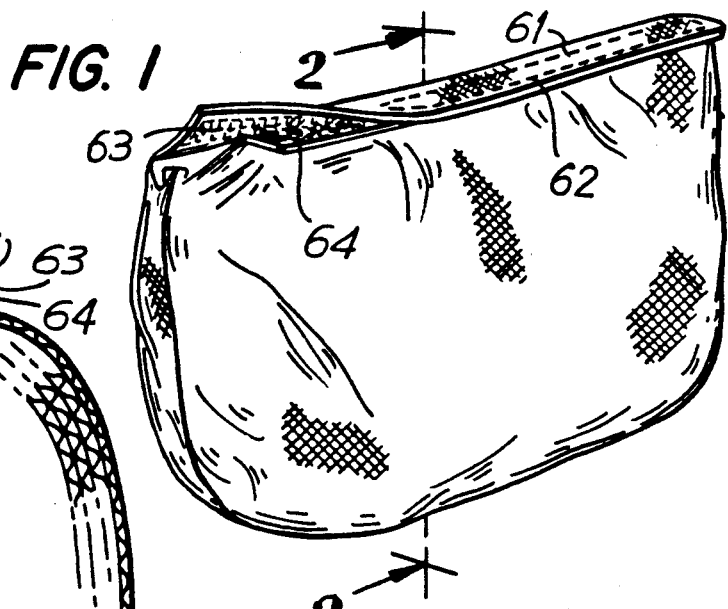
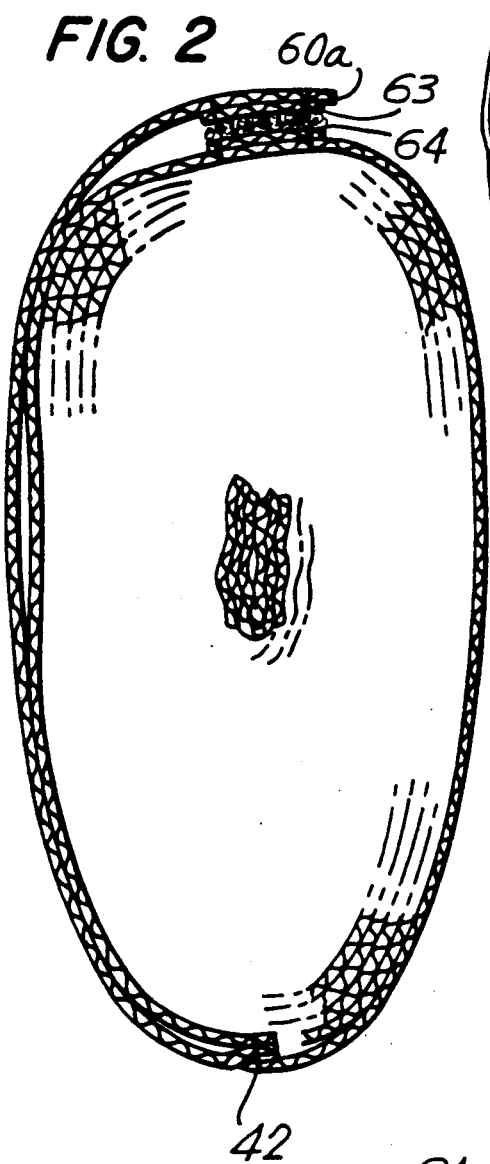
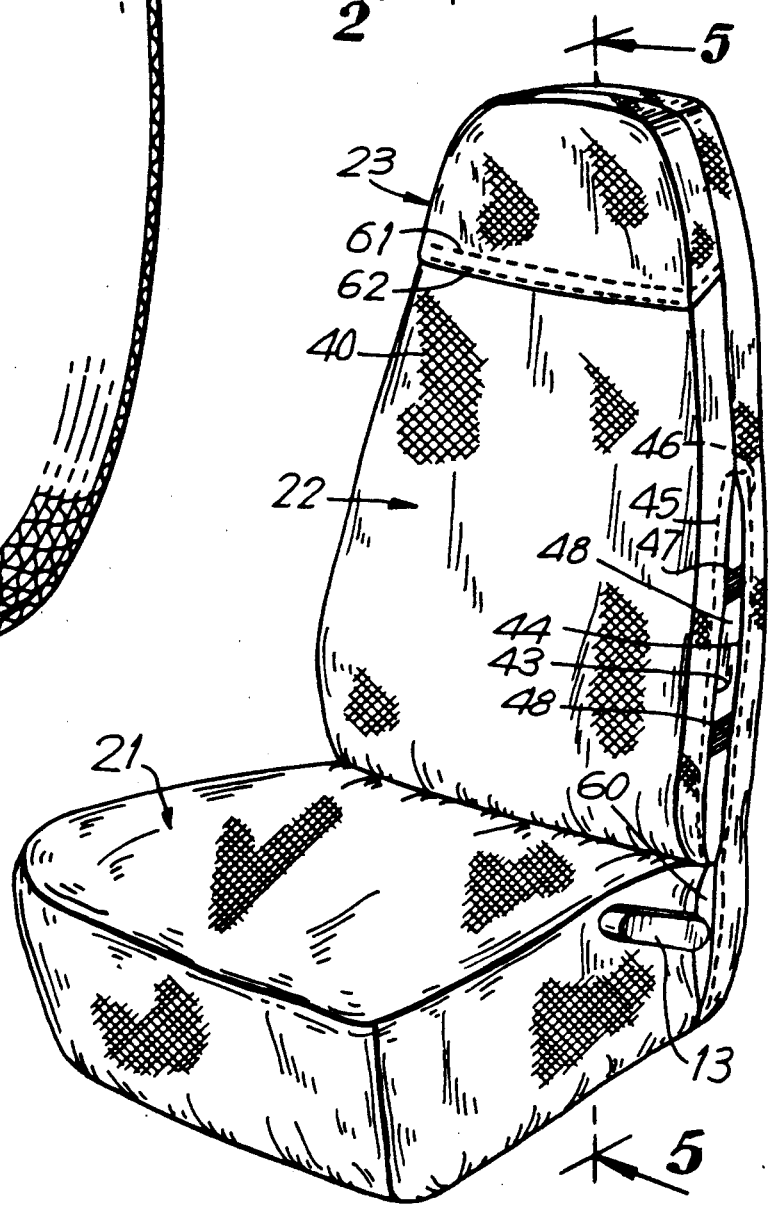

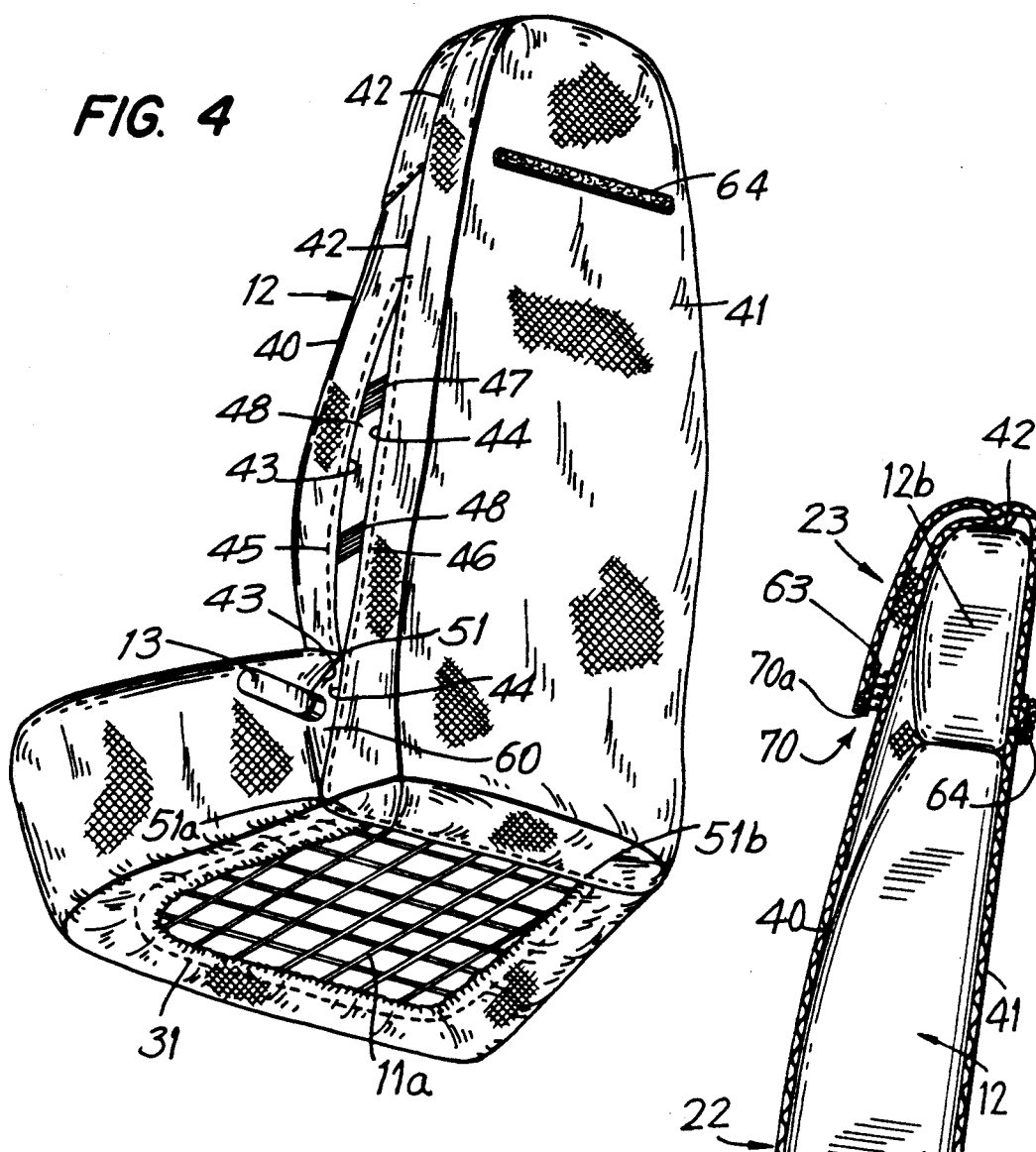
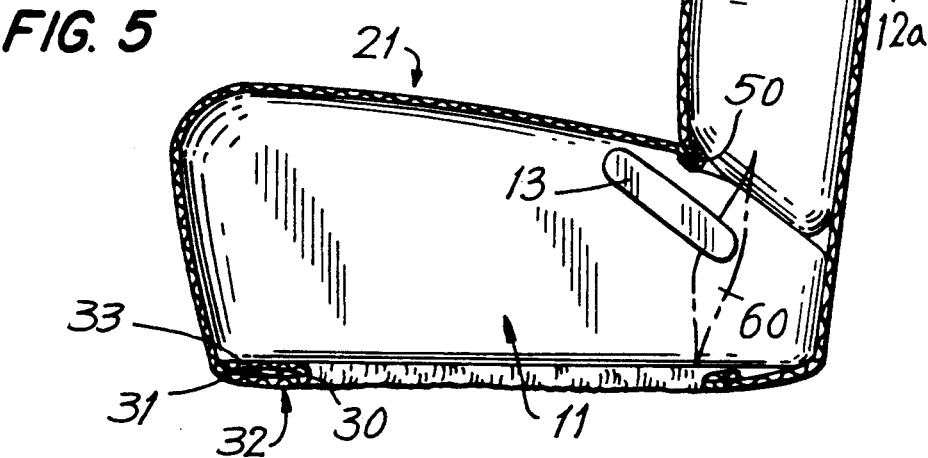

REMOVABLE SEAT COVER

BACKGROUND OF THE INVENTION

This invention relates to a removable seat cover, particularly a removable automobile seat cover.

Removable seat covers are widely used, to protect a permanent seat covering and/or provide a more decorative appearance. No removable seat cover commercially available prior to the present invention included means integral with the seat cover for storage of the seat cover in a compact, protected configuration. While such self-storage feature would be generally advantageous, it would be particularly advantageous where the cover is intended for an automobile or other vehicle having limited storage capacity. The self-storage feature, i.e., the storage means being an integral part of the cover, would eliminate possible loss or mislaying of the storage means.

It is, therefore, an object of the invention to provide a removable seat cover, especially for an automobile or other vehicle, having storage means for the seat cover which storage means is an integral part of the cover.

Other objects and advantages of the invention will be apparent from the following description of the invention.

SUMMARY OF THE INVENTION

According to the invention, there is provided a removable cover for a seat, such as, but without limitation to, an automobile or other vehicle seat, the seat having a seat portion and a back portion and the cover having respective portions for covering the back and seat portions of the seat and, integral therewith, means for storing the seat cover when not in use. More particularly, the storing means comprises a pocket formed on the seat cover.

BRIEF DESCRIPTION OF THE DRAWINGS

The invention will be further described by reference to a specific embodiment, as illustrated in the drawings, in which:

FIG. 1 is a perspective view of a seat cover according to the invention in a stored configuration;

FIG. 2 is a cross-sectional view taken on section line 2—2 of FIG. 1;

FIG. 3 is a, front perspective view of the seat cover on an automobile bucket seat;

FIG. 4 is a rear perspective view of the seat cover on the automobile bucket seat; and FIG. 5 is a right side view of the seat cover on the automobile bucket seat, with the seat cover shown in cross-section.

DETAILED DESCRIPTION OF A PREFERRED EMBODIMENT

In FIGS. 3–5 a preferred embodiment of a seat cover according to the invention is shown on an automobile bucket seat. The seat includes a seat portion 11, a back portion 12 comprising a main back portion 12a and a headrest 12b and an adjustment lever 13 for actuating a mechanism (not illustrated) for adjusting the inclination of the back portion 12. (The underside of the seat portion 11 may be conventionally provided with a network of resilient wires 11a as part of the upholstery but this has nothing to do with the present invention.) Whereas only the right side of the seat cover is visible in FIGS. 3–5, it is to be understood that the left side of the seat cover is of construction identical to the right side.

The seat cover is made of a woven nylon fabric but may be made of any other pliable material such as other fabrics and plastic foils in general. The seat cover includes a seat covering portion 21, a back covering portion 22 and a pocket 23.

The seat covering portion 21 is shaped to conform generally to the seat 11 and, to permit it to fit the seat 11 regardless of the exact dimensions of the seat 11, may be sized sufficiently large for all seats 11 regardless of the automobile make and model. The seat covering portion 21 has a folded over lower edge 30 and is stitched by a line of stitches (seam) 31 at a uniform small distance, typically about an inch or two, from the edge 30 to form a hem 32 between the edge 30 and the seam 31, enclosing a conventional elasticized fabric band 33. Thus, the seat covering portion 21 is fitted over the seat portion 11 by manually stretching the band 33 while working the seat covering portion over, around and under the seat portion 31, the seat covering portion 21 being cut sufficiently roomily that it is thus fittable onto the seat portion 11, whereupon the band 33 draws in the hem 32 of the seat covering portion 21 to cause the seat covering portion 21 to snugly conform to the seat portion 11.

The back covering portion 22 is shaped to conform generally to the back 12 and, to permit it to fit the back 12 regardless of the exact dimensions of the back 12, may be sized sufficiently large for all backs 12 regardless of the automobile make and model. The back covering portion 22 is comprised of a front panel 40 for covering the front and contiguous portion of the sides of the back 12 and a rear panel 41 for covering the rear and a contiguous portion of the sides of the back 12. An upper portion of the front panel 40 and the rear panel 41 are connected together by means of a stitched seam 42. Below the upper portion thereof, the front and rear panels 40, 41 have respective folded over side edges 43, 44 and are stitched by respective lines of stitches (seams) 45, 46 each at a uniform small distance, typically less than an inch, from the respective edges 43, 44 thereby to finish the edges 43, 44 with respective hems. Elasticized fabric bands 47, 48, of the same conventional elasticized fabric as band 33, are stitched into the hems thereby to bridge space 48 formed between the edges 43, 44 (FIGS. 3 and 4); the opposite side (which is not shown in the drawings) is of identical construction. The bands 47, 48 permit the back covering portion 22 to accommodate seat backs of various dimensions as the back covering portion 21 is manually worked down over the seat back 12.

The front panel 40 is stitched to the seat covering portion 21 at a seam 50 and the rear panel 41 is stitched to the front panel 40 and to the seat covering portion 41 at a common seam 51 for the three. The seam 51 extends continuously around the lower edge of the rear panel 41 and respective portions 51a and 51b, thereof, anchor respective ends of the elastic band 33. The elastic band 33 thereby also permits a lower portion of the rear panel 41 to be manually worked down the rear of the seat portion 21 whereupon the elastic band 33 draws that lower portion snugly under a rear portion of the underside of the seat portion 21. A space or opening 60 formed between edges 43 and 44, seam 51 and a portion (not visible) of the band 33 contiguous with the seam segment 51a permits the lever 13 to be accommodated outside the cover, for access by a person using the covered seat. The elasticity of the band 33 permits the opening 60 to temporarily be pulled more widely open in the manual fitting of the cover onto the seat to work the lever 13 to the outside of the cover during manual fitting of the cover onto the seat. The elasticity of the bands 33, 47 and 48, which permits ready manual fitting of the cover onto the seat, equally readily permits manual removal of the cover from the seat.

When the cover is not fitted onto the seat it is desirable that it be stored in a compact configuration and that the means for such storage be an integral part of the cover to avoid the possibility of loss or mislaying of the storage means. To that end, the pocket 23 overlying an upper portion of the front panel 40 is provided, the pocket being held in pace by a portion of the same seam 42 that fastens together the uppermost portions of the front and rear panels 40, 41. Consequently, the pocket 23 has a mouth 70 oriented downward, i.e., toward the seat covering portion 21. Across the interior of lip 70a of the mouth 70 is stitched by means of parallel seams 61, 62 a strip of Velcro brand fastener hook tape 63. This cooperates, in a manner which will hereinafter be described, with a strip of Velcro brand fastener loop tape 64 stitched substantially across the rear panel 41. The distances between the uppermost portion of the seam 42 and the hook tape 63, on the one hand, and the loop tape 64, on the other hand, are substantially the same.

For self-storage of the seat cover when it is not in use, beginning with the lower edge 30, the cover is rolled over and over upon itself toward the pocket mouth 70 until the leading edge of the seat cover roll thus formed reaches the pocket mouth 60, whereupon the seat cover roll is rolled and stuffed into the pocket 23. At this point the hook tape 63 and the loop tape 64 are aligned in mutually facing relationship whereupon the hook tape 63 is manually pressed onto the loop tape 64 thereby to cause the hooks of the hook tape 63 to engage the loops of the loop tape 64 to close the pocket (FIGS. 1 and 2). Opening of this closure is effected by manually peeling the hook tape 63 away from the loop tape 64 (FIG. 1).

While the invention has been described by reference to a specific embodiment, it is to be understood that such description is intended to be illustrative and that the scope of the invention is intended to include the subject matter of the hereto appended claims and equivalents thereof. For example, the seat cover may be constructed to fit seating other than a vehicle bucket seat, such as a vehicle bench seat or any indoor or outdoor seating whether of single or multiple occupant design. The necessary stretchability or "give" of the seat cover to facilitate its fitting onto and removal from the seating may be accomplished by means other than those illustrated, e.g., the seat cover may be fabricated of a stretch fabric. Moreover, in principle, the self-storage feature of the invention may be incorporated in seat covers which do not stretch or give but are readily fittable onto and removable from seating by such means as having portions of panels of the seat cover releasably held together by ties, snappers, Velcro brand fasteners, zippers or other fastening means. The closure for the pocket need not be a Velcro brand closure but may be any other closure, such as a snapper or a zipper. The foregoing is not intended to be inclusive of all embodiments within the spirit and scope of the invention.

What we claim is:

1. A removable cover for a seat, the seat having a seat portion and a back portion, the cover being comprised of a pliable material and having a back covering portion, a seat covering portion, a pocket formed on an exterior surface of the cover, the back covering portion, seat covering portion and pocket being integral, the pocket overlying an upper portion of the seat back covering portion for covering the front of the seat back and having a mouth oriented toward the seat covering portion, the pocket mouth having a lip, and mutually cooperating closure means provided on the lip and on the seat back covering portion adjacent the lip, the seat covering portion and the back covering portion except for said upper portion being receivable in the pocket when the cover is not in use and the pocket then being closable by means of said closure means.

* * * * *